United States Patent Office 2,877,860
Patented Mar. 17, 1959

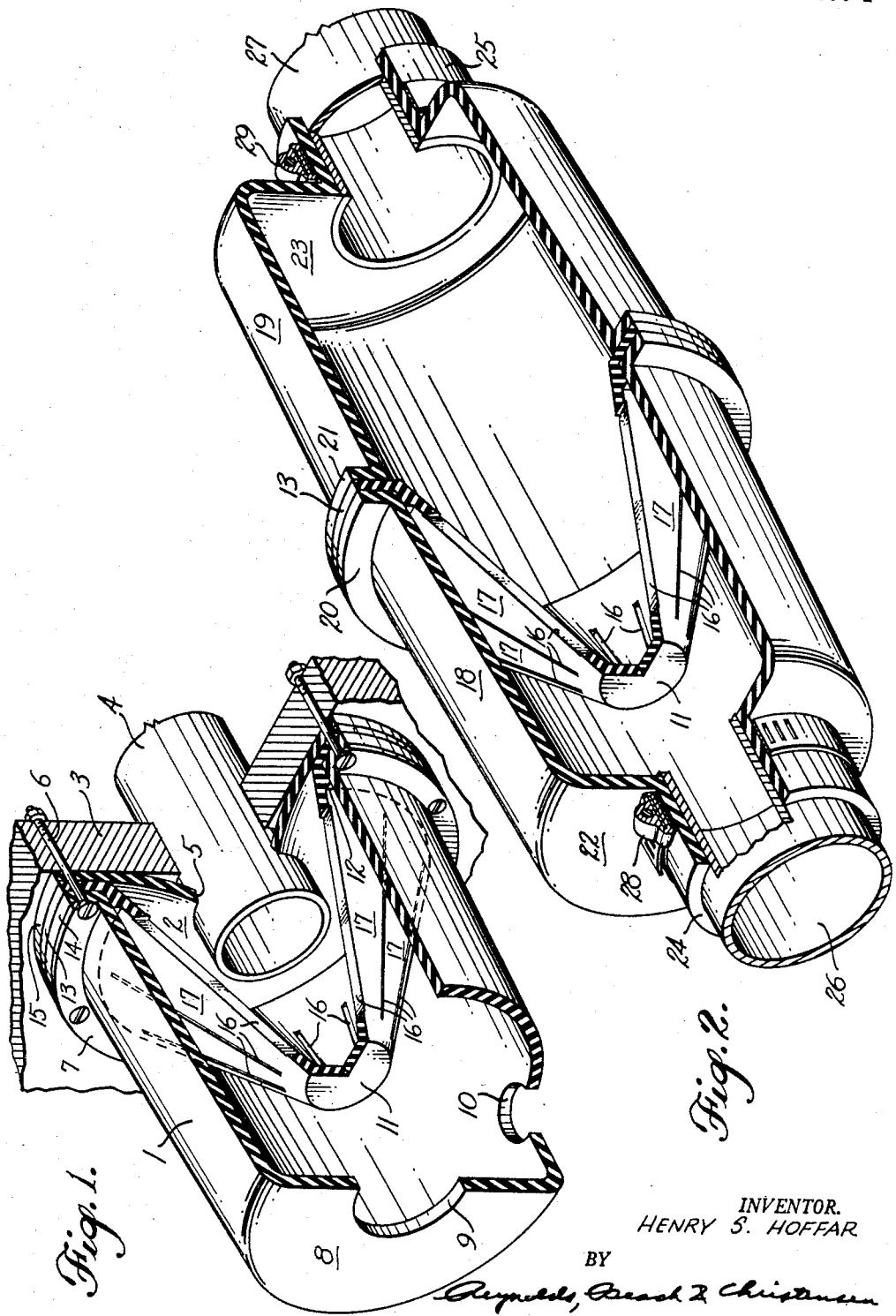

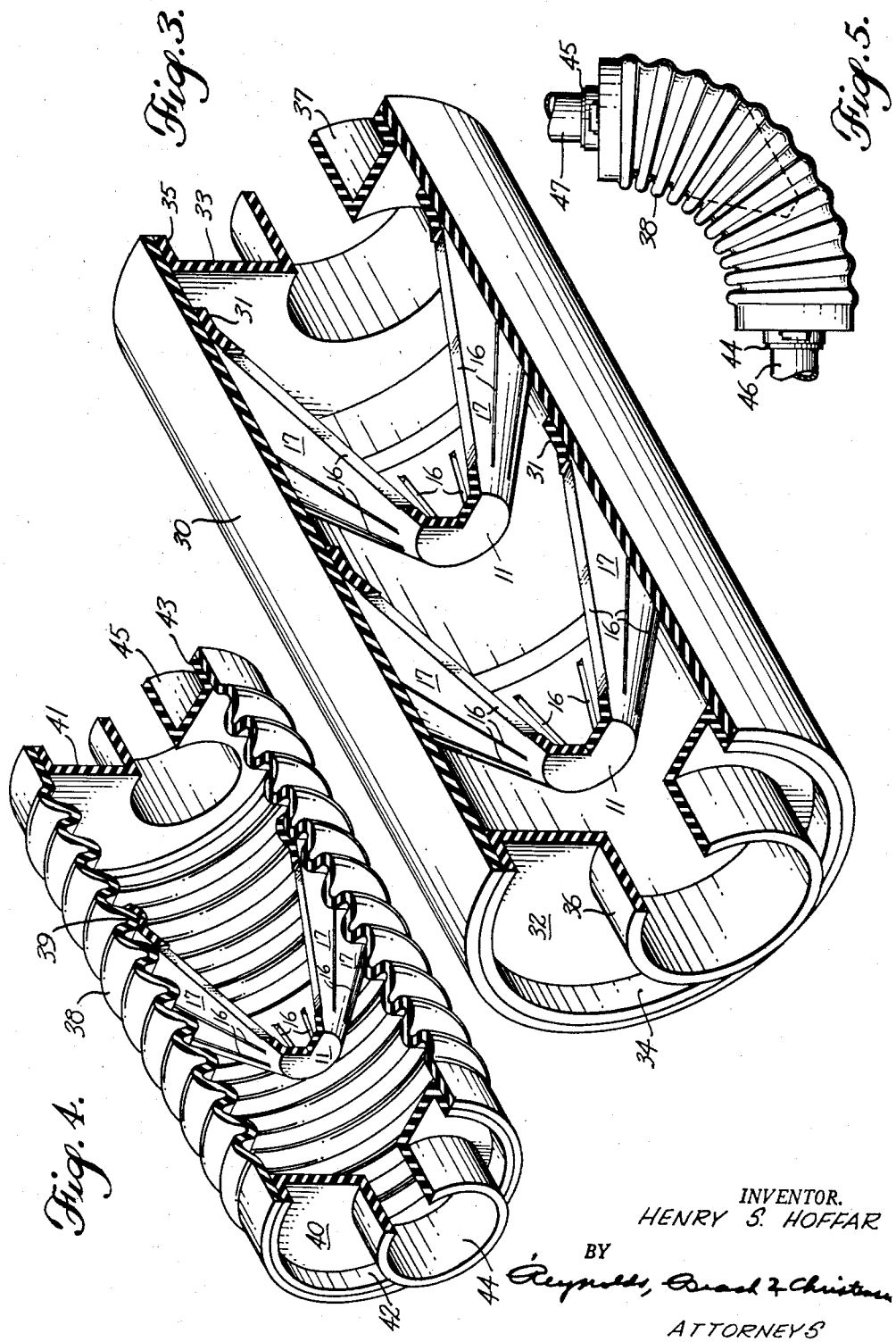

2,877,860

APERTURED PLIABLE RESILIENT DAMPER WALL SILENCER

Henry Stonestreet Hoffar, Sidney, British Columbia, Canada

Application July 23, 1956, Serial No. 599,382

14 Claims. (Cl. 181—50)

This invention relates to a silencer or muffler intended principally for use on internal combustion engines and particularly those having a wet-type exhaust such as a marine installation. It is possible, however, that such silencers could be used satisfactorily for stationary or even automotive internal combustion engines or for analogous purposes such as the air intake of a gas turbine. This application discloses an improvement on the silencer of my previous Patent No. 2,859,830 for a vibratory flexible silencer.

Like the silencer disclosed in my patent application aforesaid, the present silencer preferably is composed of a tubular body made of pliable resilient stretchable material such as elastomer or plastic material of medium hardness and contains a damper wall or walls of similar material. The principal improvement of the present muffler resides in the damper wall construction.

A principal object of the present invention is to provide a silencer or muffler construction which incorporates a hollow body having a damper wall of pliable, fairly soft or medium hard elastomer material apertured extensively for the size of the muffler body, to provide an exceptionally large amount of distendable slit and flutterable slit edge length for a given size of body. More specifically, this object is accomplished by utilizing a damper wall of cup shape which has more wall area capable of being apertured than a damper wall disposed perpendicular to the direction of flow of gas through the hollow body.

Another object is to provide a plurality of slits in a silencer damper wall of pliable resilient material which define a strip therebetween having both ends anchored which can flutter to damp pulsations of gas passing through slits forming its opposite edges.

Another object is to locate a cup-shaped damper wall in a tubular silencer body of pliable, resilient material with the central portion of such baffle disposed downstream from its marginal portion with respect to the direction of flow of gas through the silencer body. Gas flowing through the body will therefore pass into the mouth of the cup-shaped damper wall and from the inner side of the damper wall cup to its outer side, and during such passage will be deflected outward from a flow direction parallel to the axis of the body so as to impinge against the inner surface of the pliable resilient elastomer longitudinal wall of the body after passing through the damper wall apertures, further to damp the pulsations of the gas and thereby to quiet its flow.

An additional object is to provide a silencer body construction of pliable, resilient material which can be deformed easily to connect gas conduits which are relatively offset or form an angle between them instead of being parallel.

It is also an object to provide a muffler of comparatively simple and economical construction which cannot easily be broken or deteriorate rapidly even when used in a salt water cooled marine installation.

While effecting maximum reduction in noise, it is an object of the present silencer to produce very little back pressure so as not to affect adversely the operation of an engine with which it is used.

In addition, the improved silencer of the present application has all the advantages and accomplishes all of the objects of the silencer disclosed in my prior application mentioned above.

A preferred form of silencer construction, as shown in the drawing, capable of accomplishing the foregoing objects, includes a substantially cylindrical body of elastomer material of medium hardness incorporating one or more damper walls of similar material so that both the body and such walls are of pliable, resilient material. The cup-shaped damper walls shown are frusto-conical and their conical surfaces have apertures in the form of straight slits along slant height elements of the wall defining therebetween strips connected at one end to the central portion of the damper wall and at the other end to the marginal portion of such wall. One or more of such damper walls can be incorporated in the body and suitable connections for gas pipes are provided at opposite ends of the body. To facilitate installation of the muffler and to enable its opposite ends to be connected to tubes which are offset or disposed at an angle, the body wall may be formed with a series of annular corrugations.

Figure 1 is a top perspective view of one type of silencer, which is adapted for surface mounting at one end, parts being broken away.

Figure 2 is a top perspective view of an end coupling mounted type of muffler having parts broken away.

Figure 3 is a top perspective view of a somewhat different type of end coupling mountable muffler with parts broken away.

Figure 4 is a top perspective view of still a different type of end coupling mountable muffler having parts broken away, and Figure 5 is a plan view of such a muffler having its opposite ends connected respectively to pipes arranged at an angle.

In the muffler shown in Figure 1, which is of the simplest type, the hollow body 1 is made of pliable, resilient elastomer material which is highly resistant to deterioration by oil and salt water, such as being of neoprene. Where the muffler is used in a marine engine installation, the temperatures are sufficiently low so that the heat does not affect this material adversely. For installations where higher temperatures are encountered, silicone rubber may be used. In either case, the rubber is of medium hardness, being fairly soft so that when the wall thickness of the body is one quarter of an inch, for example, it is reasonably pliable by application of manual pressure.

In the particular installation shown, the muffler is of the surface mounted type, having an end wall 2 which may be secured in face to face relation to a boat bulkhead 3, such as the transom, through which the engine exhaust pipe 4 protrudes. The aperture 5 in the end wall 2 may be somewhat smaller than the outside diameter of the exhaust pipe so that the aperture will be distended as it is forced over the end of the exhaust pipe in the manner shown. The central portion of the muffler end wall 2 may therefore be somewhat deflected, but the periphery of the aperture 5 will embrace tightly the wall of the exhaust pipe. The muffler may be secured to the bulkhead 3 by bolts 6 extending through a flange encircling the end of the body 1 and a retainer ring 7, preferably of metal, which constitutes a rigid backing for the flange.

The opposite end of the body preferably is substantially closed by an end wall 8 which may have a gas discharge aperture 9 located centrally of it. Because a marine engine exhaust is of the wet type, a drain hole 10 is provided in the bottom of the body side wall 1 through which the water mingled with the exhaust gas can be discharged. While the body itself being of pliable, resilient material will absorb pulsations of the gas to some extent and thereby quiet it partially, as explained in my prior Patent No. 2,859,830, a much greater silencing effect is produced by incorporation of a cup-shaped damper wall within the body having apertures through which the exhaust gas flows.

As illustrated in Figure 1, the damper wall is of frustoconical shape having its planar central portion 11 located downstream a considerable distance in the direction of flow of the gas from its marginal portion 12 encircling its mouth. Such marginal portion has a radially extending flange 13 sandwiched and vulcanized between a radially outwardly extending flange 14 on the end of the body 1 and the marginal portion 15 of the end wall 2. By vulcanizing together the body component, the damper wall component and the end wall component in this manner, a unitary construction is formed economically by the assembly of parts which may be prefabricated individually. The several parts may be thus assembled at the factory and can be installed on a bulkhead and connected to an exhaust pipe 4 in the manner shown without any modification of the construction except, perhaps, to cut hole 5 in end wall 2 somewhat larger, if necessary, to accommodate the exhaust pipe 4.

The most important feature of the cup-shaped damper wall is the large area which its wall portion inclined relative to the direction of flow of gas through the hollow body affords to be apertured for passage of gas. Preferably, as shown, the apertures are in the form of narrow straight slits 16 along slant height elements of the conical wall portion of the damper wall. Because the cup-shaped member is of circular cross section the slits may be said to extend substantially axially of such member. These slits may be molded in the damper wall tapering from the inner side of the wall toward its outer side. Such slits define between them strips 17, anchored at both ends by each having its inner and forward end integral with the central portion 11 of the wall and its outer and rearward end in the direction of flow of the gas integral with the marginal portion of the wall. As shown, where twelve slits 16 are provided, forming twelve strips 17 in the wall, the arcuate angle between adjacent slits would be thirty degrees so that, because the slits are straight and the arcuate angle small, the strips are substantially flat, as shown.

As the exhaust gas passes through pipe 4 into the hollow of the tubular muffler body, it will be discharged within the mouth of the cupped damper wall, a slight pressure will be built up by the resistance of the slits 16 to the passage of gas through them, and this pressure will be reflected by the effect of a slight back pressure on the engine. Such pressure of the exhaust gas will distend the slits 16, or open them to a substantially expanded width, and stretch the strips 17. Because of the great aggregate length of the slits, however, the pressure of the exhaust gas required to spread the slits sufficiently to enable a given quantity of gas to flow through them will be slight. The more slits provided and the greater their width, the less will be the pressure required within the cupped damper wall to produce the given flow through the slits.

Because of the pulsating character of the gas, the strips 17 will flutter in and out and thereby very effectively damp the pulsations of the gas to quiet it. Moreover, the gas flowing through the slits 16 must change direction from a direction lengthwise or axially of the body 1 to an outwardly and forwardly inclined direction. As the gas passes through the slits 16, the pressure on it will be released both because of the lack of further necessity of the gas to force its way through restricted apertures and because of the greater volume of the chamber within the body at the discharge or outer side of the damper wall as compared with the intake or inner side of such wall. Moreover, because of the change in direction of flow of the gas required for it to pass through the slits, the gas discharge from the slits will continue at comparatively high velocity in such deflected direction to impinge against the inner surface of the longitudinal wall of body 1. Because such longitudinal wall is made of pliable, resilient elastomer material as described, such impingement will further damp pulsations of the gas to quiet it.

The thickness of the damper wall may be equal to or slightly less than the thickness of the body 1, such as being from one-eighth of an inch to one-quarter of an inch in thickness. Also the cone angle of such wall may vary from approximately sixty degrees to approximately ninety degrees preferably, that shown being of approximately seventy-five degrees. The smaller the cone angle, the greater will be the wall area inclined relative to the direction of flow of gas through the hollow body. If the cone angle is made too small however, the slit wall may be too closely adjacent to the longitudinal wall of the body 1 to prevent excessive interference with flow of gas through the slits and produce an undesirably high back pressure. On the other hand, if the cone angle is made too large, the advantage of using a cup-shaped damper wall over a planar wall is much less. In designing a cupped damper wall, therefore, these factors should be taken into consideration in determining the marginal width of the wall, its cone angle and the altitude of the conical frustrum.

In Figure 2 a coupling mounted type of muffler is shown which incorporates the same type of cupped damper wall as used in the muffler of Figure 1 described above. In this instance, the body is made of two tubular sections 18 and 19, preferably of cylindrical shape. The flange 13 projecting outward from the margin of the damper partition wall is sandwiched between flanges 20 and 21 projecting radially outward from adjacent ends of the body sections 18 and 19 and these three flanges may be secured together such as by vulcanizing to form an integral unit of the two body sections and the damper wall. As in the muffler previously described, the body sections, as well as the damper wall, will be made of pliable, resilient material such as an elastomer which is fairly soft or of medium hardness.

Each of the body sections 18 and 19 has an end wall 22 and 23 respectively at their ends opposite the flanges 20 and 21. From these end walls project respectively coupling neck portions 24 and 25 into which may be inserted a discharge gas pipe 26 and an inlet gas pipe 27. These coupling necks can be constricted about the comparatively rigid pipes received within them by conventional clamps 28 and 29. In this type of silencer, the damper wall operates in the same way and serves the same purpose as described in connection with the silencer shown in Figure 1. In both cases, water carried by the exhaust gas is carried through the distended slits 16 without difficulty. Particularly if the coupling neck 24 at the discharge end of the muffler shown in Figure 2 is offset somewhat toward the bottom of the muffler body, it is not necessary to provide a drain hole for water in the body as provided for the muffler body in Figure 1.

The tubular body or longitudinal wall 30 of the muffler shown in Figure 3 is not formed of sections, but extends unbroken from end to end. In this case, two damper partition walls are shown received in the body although only one might be used, or more damper walls could be provided. Instead of these damper walls having outwardly extending peripheral flanges, they are shown as incorporating cylindrical flanges 31 at their margins which are of a size to fit snugly within the muffler body 30. As in the previous forms of muffler, both the body and the damper walls preferably are made of pliable, resilient material such as an elastomer. Consequently, the damper walls may conveniently be anchored within the body by vulcanizing the flanges 31 and body 30 together.

The opposite ends of the body are closed by end walls 32 and 33, respectively, which, like the damper walls, have cylindrical flanges of a size to fit snugly within the body 30. Such flanges 34 and 35, respectively, are directed from the end walls toward the adjacent ends of the body 30 so as to enable such flanges and the ends of the body to be clamped easily for vulcanizing. In addition, the end walls 32 and 33 carry coupling necks 36 and 37 projecting from them, respectively, to enable this silencer to be connected easily between intake and discharge gas pipes in a manner similar to that illustrated in Figure 2 and described in connection with it.

The construction of the silencer shown in Figure 4 is very much the same as that shown in Figure 3 except that hte longitudinal wall 38 of the silencer has annular corrugations. The material of this silencer and its damper wall is similar to that described above for the corresponding parts, being a pliable, resilient material such as an elastomer of medium hardness. The axially directed marginal flange 39 of the damper wall is formed complemental to the valley between adjacent ridges of the corrugated body. Such flange may be secured to the silencer body by vulcanizing as explained previously. Likewise, the ends 40 and 41 may have their respective axially directed cylindrical flanges 42 and 43 vulcanized to the opposite ends of the body 38.

The purpose of making the body 38 of corrugated construction is to enable the coupling necks 44 and 45, carried by end walls 40 and 41, respectively, to be connected readily to gas pipe sections which are offset to some extent even though the coupling necks 44 and 45 may be in axial alignment when the muffler is in relaxed condition. The corrugated character of the body not only enables the coupling necks to be placed easily in staggered relationship, but such necks may be deflected angularly. In fact, if the body of the silencer is proportioned properly, it is quite feasible to deflect the coupling necks through ninety degrees so that they can be connected to gas tubes such as 46 and 47 shown in Figure 5 which are in perpendicular or right angle relationship. A silencer having this capability will simplify the silencer installation greatly in some instances, yet the silencer will be substantially as effective as when straight in damping the pulsations of the exhaust gas and quieting it as it flows through the silencer.

I claim as my invention:

1. An internal combustion engine exhaust gas silencer comprising a hollow body for flow of pulsating exhaust gas therethrough and having a damper wall of pliable resilient medium hard elastomer material, said damper wall having therethrough two substantially straight slits spaced throughout their lengths and defining therebetween a substantially straight pliable resilient strip of such medium hard elastomer material anchored at both ends for impingement thereagainst of pulsating gas flowing through said hollow body and flutterable during passage of such pulsating gas through said slits past the edges of said strip to reduce the noise of such gas.

2. An internal combustion engine exhaust gas silencer comprising a hollow body for flow of pulsating exhaust gas therethrough and having a damper wall of pliable resilient medium hard elastomer material, said damper wall having therethrough a plurality of slits of substantially uniform width spaced throughout their lengths and defining therebetween a plurality of pliable resilient strips of such medium hard elastomer material anchored at both ends for impingement thereagainst of pulsating gas flowing through said hollow body and flutterable during passage of such pulsating gas through said slits past the edges of said strips to reduce the noise of such gas.

3. An internal combustion engine exhaust gas silencer comprising a conical damper wall of pliable resilient medium hard elastomer material, a hollow body connected to the larger end of said conical damper wall and opening into the space inwardly of said wall, said conical damper wall tapering in the direction in which gas flows into the space inwardly of said wall, and said conical damper wall having therethrough straight slits extending along slant height elements of said damper wall, spaced throughout their lengths and defining therebetween substantially flat pliable resilient stretchable strips of such elastomer material, each strip having one end anchored by being integral with the marginal portion of said damper wall and its other end anchored by being integral with the central portion of said damper wall, for impingement thereagainst of pulsating exhaust gas flowing through said hollow body and flutterable during passage of such pulsating exhaust gas through said slits past the edges of said strips to reduce the noise of such gas.

4. An internal combustion engine exhaust gas silencer comprising a hollow body of pliable resilient medium hard elastomer material for flow of pulsating gas therethrough, and including a conical damper wall of such elastomer material and a longitudinal wall connected to the larger end of said conical damper wall and opening into the space inwardly of said damper wall, said conical damper wall tapering in the direction in which gas flows into the space inwardly of said damper wall, and said conical damper wall having through a portion thereof generally facing said hollow body straight slits extending along slant height elements of said damper wall, spaced throughout their lengths and defining therebetween substantially flat pliable resilient stretchable strips of such elastomer material, each strip having one end anchored by being integral with the marginal portion of said damper wall and its other end anchored by being integral with the central portion of said damper wall, for impingement thereagainst of pulsating exhaust gas flowing from the space within said longitudinal wall and flutterable during passage of such pulsating exhaust gas through said slits past the edges of said strips to reduce the noise of such gas.

5. An internal combustion engine exhaust gas silencer comprising a damper wall of pliable resilient medium hard elastomer material having therethrough slits spaced throughout their lengths and defining therebetween pliable resilient stretchable strips of such elastomer material anchored at both ends for impingement thereagainst of pulsating exhaust gas and flutterable during passage of such pulsating exhaust gas through said slits past the edges of said strips to reduce the noise of such pulsating exhaust gas.

6. An internal combustion engine exhaust gas silencer comprising a hollow body of pliable resilient medium hard elastomer material for flow of pulsating exhaust gas therethrough and including a longitudinal wall of such elastomer material and a damper wall of such elastomer material and of cupped shape in relaxed, unstressed condition, having the marginal portion of its mouth sealed to said longitudinal wall for flow of exhaust gas into the mouth of said cupped shape damper wall, said damper wall tapering downstream in the direction of exhaust gas flow through said hollow body, said damper wall including a portion thereof facing said longitudinal wall having therein slits spaced throughout their length for flow of exhaust gas therethrough out of the cupped conformation of said damper wall for impingement against said damper wall to reduce the noise of such exhaust gas, and said slits defining therebetween pliable resilient stretchable strips of such elastomer material anchored at both ends for impingement thereagainst of pulsating exhaust gas flowing into the space within the cupped conformation of said damper wall and flutterable during passage of such pulsating exhaust gas through said slits past the edges of said strips to reduce further the noise of such exhaust gas.

7. An internal combustion engine exhaust gas silencer comprising a hollow body for flow of pulsating exhaust gas therethrough and including a longitudinal wall of pliable, resilient elastomer material, and a damper wall of pliable resilient elastomer material within said hollow body and of cupped shape in relaxed, unstressed condition, having its mouth facing upstream with respect to the flow of exhaust gas through said body, said mouth being sealed to said longitudinal wall for flow of exhaust gas into the mouth of said cupped shape damper wall in the direction of exhaust gas flow through said hollow body, said cupped shape damper wall having an apertured portion generally facing said longitudinal wall for flow of exhaust gas outward therethrough to impinge against the portion of said elastomer longitudinal wall downstream from the mouth of said cupped damper wall to reduce the noise of such pulsating exhaust gas.

8. An internal combustion engine exhaust gas silencer comprising a cup member of pliable, resilient elastomer material having a wall with a plurality of stragiht slits therethrough, and conduit means connected to the mouth of said cup member for supplying pulsating exhaust gas through the mouth into the interior of said cup member for flow outwardly therefrom through the slits of said wall.

9. An internal combustion engine exhaust gas silencer comprising a hollow body for flow of pulsating exhaust gas therethrough and including a longitudinal wall and a damper wall of pliable, resilient elastomer material disposed within said longitudinal wall, said damper wall having a portion generally facing said longitudinal wall with narrow slits extending generally lengthwise of said longitudinal wall for flow of exhaust gas outward therethrough to reduce the noise of such pulsating exhaust gas.

10. An internal combustion engine exhaust gas silencer comprising a hollow body for flow of pulsating exhaust gas therethrough and including a longitudinal wall of pliable, resilient elastomer material and a damper wall of pliable, resilient elastomer material disposed within said longitudinal wall, said damper wall having an apertured portion generally facing said elastomer longitudinal wall for flow of exhaust gas outward therethrough to impinge against said elastomer longitudinal wall to reduce the noise of such pulsating exhaust gas.

11. An internal combustion engine exhaust gas silencer comprising a wall of pliable, resilient elastomer material and of cupped shape in relaxed, unstressed condition, and a transverse wall having its marginal portion connected to the mouth of said cupped wall and having an exhaust gas admitting aperture therethrough for flow of pulsating exhaust gas through said transverse wall into the mouth of said cupped wall, and said cupped wall having a plurality of slits therethrough openable to a substantially expanded width by the force of exhaust gas flowing outwardly through said cupped wall.

12. An internal combustion engine exhaust gas silencer comprising a wall of pliable, resilient elastomer material and a cupped shape in relaxed unstressed condition, said wall having a plurality of slits therethrough openable to a substantially expanded width by the force of exhaust gas pressing on said wall for flow of pulsating exhaust gas therethrough, and a second wall connected to the mouth of said cupped shape wall and being apertured over an area considerably smaller than the area within the mouth of said cupped shape wall for reduction in velocity of pulsating exhaust gas flowing from the aperture of said second wall through said cupped shape wall prior to flow of such gas through said cupped shape wall.

13. An internal combustion engine exhaust gas silencer comprising a pliable, resilient elastomer material member having a wall of cupped shape in relaxed, unstressed condition with a circular mouth and being of substantially circular cross-section, said wall having therethrough a plurality of slits extending substantially axially of said member for flow of pulsating exhaust gas entering the mouth of said cupped shape wall outwardly through such slits in said wall.

14. An internal combustion engine exhaust gas silencer comprising a hollow body for flow of pulsating exhaust gas therethrough and including a longitudinal wall of pliable, resilient elastomer material, and a damper wall of pliable, resilient elastomer material within said hollow body and of cupped shape in relaxed, unstressed condition, having its mouth facing upstream with respect to the flow of exhaust gas through said body, said cupped shape damper wall having a portion generally facing said longitudinal wall with narrow slits therethrough openable to a substantially expanded width by the force of exhaust gas pressing against the inner side of said wall for flow of exhaust gas outward therethrough toward said longitudinal wall.

References Cited in the file of this patent

UNITED STATES PATENTS

| | | |
|---|---|---|
| 1,274,943 | Schmidt | Aug. 6, 1918 |
| 1,542,829 | Oldberg | June 23, 1925 |
| 2,073,335 | Connell | Mar. 9, 1937 |
| 2,372,587 | Krueger | Mar. 27, 1945 |
| 2,625,235 | Caulkins | Jan. 13, 1953 |
| 2,629,393 | Langdon | Feb. 24, 1953 |
| 2,688,979 | Kendrick | Sept. 14, 1954 |

FOREIGN PATENTS

| | | |
|---|---|---|
| 797,112 | France | Feb. 3, 1936 |
| 684,987 | Great Britain | Dec. 31, 1952 |

UNITED STATES PATENT OFFICE
CERTIFICATE OF CORRECTION

Patent No. 2,877,860                                  March 17, 1959

Henry Stonestreet Hoffar

It is hereby certified that error appears in the printed specification of the above numbered patent requiring correction and that the said Letters Patent should read as corrected below.

Column 8, line 3, for "and a cupped shape in relaxed unstressed" read -- and of cupped shape in relaxed, unstressed --; column 7, line 1, after "pliable" insert a comma; line 16, for "stragiht" read -- straight --.

Signed and sealed this 7th day of July 1959.

(SEAL)
Attest:

KARL H. AXLINE                                        ROBERT C. WATSON
Attesting Officer                                    Commissioner of Patents